United States Patent [19]

Steffens

[11] 4,135,755
[45] Jan. 23, 1979

[54] ARRANGEMENT FOR FLOOR GYMNASTICS

[76] Inventor: Alfred Steffens, Fluhbergstrasse 7, CH-8708 Männedorf, Switzerland

[21] Appl. No.: 813,495

[22] Filed: Jul. 7, 1977

[30] Foreign Application Priority Data

Jul. 12, 1976 [CH] Switzerland .......................... 8930/76
Dec. 16, 1976 [CH] Switzerland ........................ 15801/76

[51] Int. Cl.² .............................................. B60Q 3/34
[52] U.S. Cl. ..................................... 296/26; 296/23 G
[58] Field of Search ....................... 296/26, 23 C, 23 G

[56] References Cited

U.S. PATENT DOCUMENTS

| 2,704,223 | 3/1955 | Houdart | 296/26 |
| 2,832,637 | 4/1958 | Decosse | 296/26 |
| 3,271,065 | 9/1966 | Scuris | 296/26 |
| 3,778,100 | 12/1973 | Dillard | 296/26 |

Primary Examiner—Joseph F. Peters, Jr.
Assistant Examiner—Gene A. Church
Attorney, Agent, or Firm—Michael J. Striker

[57] ABSTRACT

An arrangement for floor gymnastics, particularly for the martial arts, has a floor element and a plurality of wall elements movable between an extended and a retracted position. The wall elements are located in the retracted position in accordion-like relationship with respect to each other. Fluid-operated drive means are provided for moving the wall elements between the retracted and extended positions. The movable wall portions include the portions which at least partially form a floor, a roof and longitudinal walls of the arrangement respectively. The wall elements in the extended position together bound an inner space which is free of supports. Some of the wall elements are hingedly connected with one another.

16 Claims, 6 Drawing Figures

ARRANGEMENT FOR FLOOR GYMNASTICS

BACKGROUND OF THE INVENTION

The present invention relates to a moving sport arrangement for floor gymnastics, and particularly for oriental martial arts, such as Judo, Ju-Jitsu, Ikido, Kendo, Taekwan-Do, Kung-Fu and the like.

Moving clinics, exhibition stands, X-ray trailers, carriages for selling food, and house trailers have been known in the art. Hand trucks have also been proposed which are convertable into exhibition stands. Moving cabins having enlargeable carrying surfaces have also been known in the art. In all these cases the respective trailers are moved by tractors in the place of use. In the above arrangements the walls, floors and roofs are folded out from a structure of the trailer. Such operation requires expenditures of several hours and cannot be done by a single person. Further, the arrangements are extended, as a rule, mechanically by means of ropes, which also constitutes essential disadvantages of the prior art arrangements. A still further disadvantage of the known constructions is that in the case when the arrangement is folded out, supports must be provided in the interior of the arrangement. It is understood that such supports occupy an essential space of the interior and makes this space unsuitable for carrying out the above floor gymnastics.

SUMMARY OF THE INVENTION

Accordingly, it is an object of the present invention to provide a moving arrangement for floor gymnastics which avoids the disadvantages of the prior art arrangements.

More particularly, it is an object of the present invention to provide a moving arrangement which has a larger surface for carrying out floor gymnastics as compared with the known arrangements, and whose interior is free of support means.

Another object of the present invention is to provide a moving arrangement for floor gymnastics whose walls are easily extended and retracted by a single person and in a substantially short time.

In keeping with these objects, and with others which will become apparent hereinafter, one feature of the present invention, briefly stated, resides in a moving arrangement for floor gymnastics which comprises a floor element and a plurality of wall elements movable between an extended and a retracted position. The wall elements in the retracted position are located in accordion-like manner with respect to each other. Fluid-operated drive means are provided for moving the wall elements between the above positions.

The thus-constructed arrangement has a larger effective area as compared with the prior art arrangement. The walls of the arrangement may be extended and retracted during an essentially small time. Finally, these operations can be performed by a single person.

In the extended position the wall elements are freely suspended and together bound an inner space which is free of supports. Some of the wall elements may be hingedly connected with each other. Stationary roof and floor members may be provided in the arrangement. The respective wall elements in the extended position together with the roof member or with the floor member may form a composite floor and a composite roof of the arrangement, respectively.

Still another feature of the present invention is that slides may be provided, which are moved in guides located under the floor of the arrangement. Longitudinal wall elements may be connected with the above slides for joint movement therewith between the retracted and extended positions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF A PREFERRED EMBODIMENT

Figure 1:
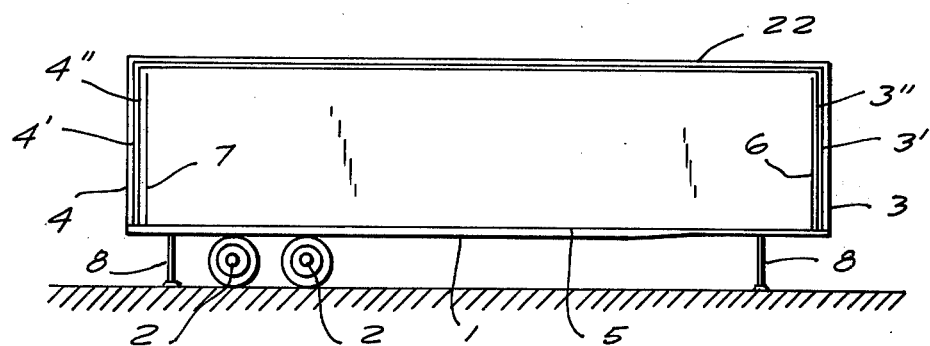
FIG. 1 is a longitudinal section of a moving arrangement in accordance with the present invention, shown in single lines.

As shown in FIG. 1, a moving arrangement for floor gymnastics in accordance with the present invention, has a housing whose chassis frame 1 is supported by one or several axles 2 and supports 8. An intermediate floor 5 is located above the chassis frame 1 of the arrangement. The housing comprises a front wall 3 facing towards a vehicle which is not shown in the drawing, and a rear wall 4 which is rearwardly spaced from the front wall 3. Extendable front wall elements 3' and 3" are located between the front wall 3 and a partition wall 6, whereas extendable rear wall elements 4' and 4" are located between the rear wall 4 and a partition wall 7. The above extendable wall elements are located in side regions of the arrangement which are free of supports. A roof member 22 is mounted on the housing.

Figure 2:
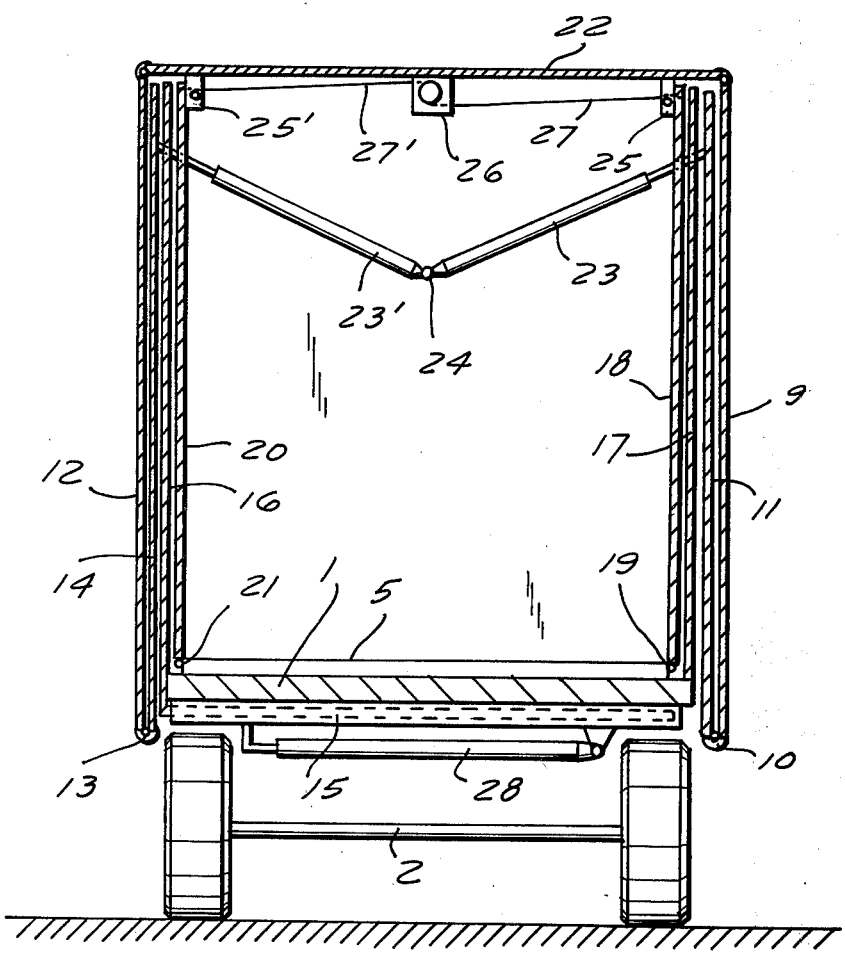
FIG. 2 is a transverse section of the arrangement shown in FIG. 1.

Further features of the present invention are shown in FIG. 2. A right longitudinal wall element 9 is connected with a longitudinal wall element 11 by a hinge 10. A left longitudinal wall element 12 is connected with a longitudinal wall element 14 by a hinge 13. Guides 15 are mounted under the chassis frame 1 and connected with a left longitudinal side element 16. A right longitudinal side element 17 is connected with not-shown in the drawing further guides which are similar to the guides 15 and are also located under the chassis frame 1. Floor elements 18 and 20 are provided, which can be lowered and are connected with the intermediate floor 5 by hinges 19 and 21, respectively. Hydropneumatic cylinders 23 and 23' are located adjacent to walls 3 and 4, and mounted in a fixed point 24. Lugs 25 and and 25' serve simultaneously for reinforcing a self-supporting construction of the roof. An electrical drive 26 for actuating cables 27 and 27' connected with the floor elements 18 and 20, is mounted on the roof member 22. A drive 28 for lateral movement of the side elements 16 and 17 is located under the chassis frame 1.

Figure 3:
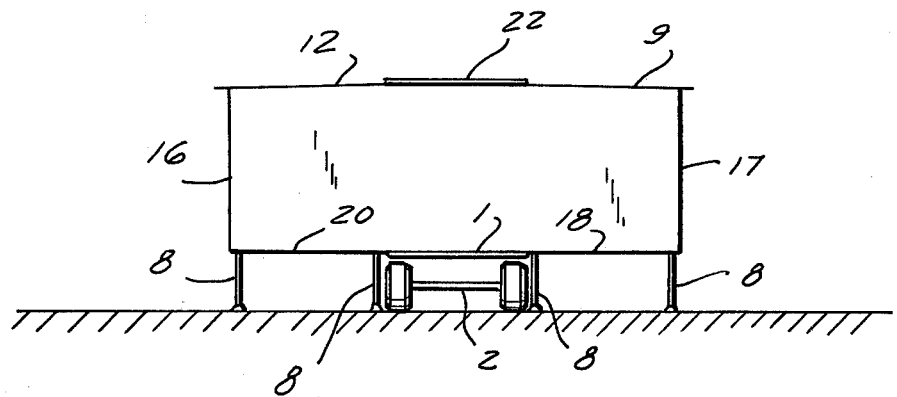
FIG. 3 is a view showing an arrangement in accordance with the present invention, in a working condition.

FIG. 3 shows the above arrangement in a working or extended condition. The chassis frame 1 is raised on the supports 8 above its springing and supported by the supports in several points. The side and floor elements are extended.

Figure 4:
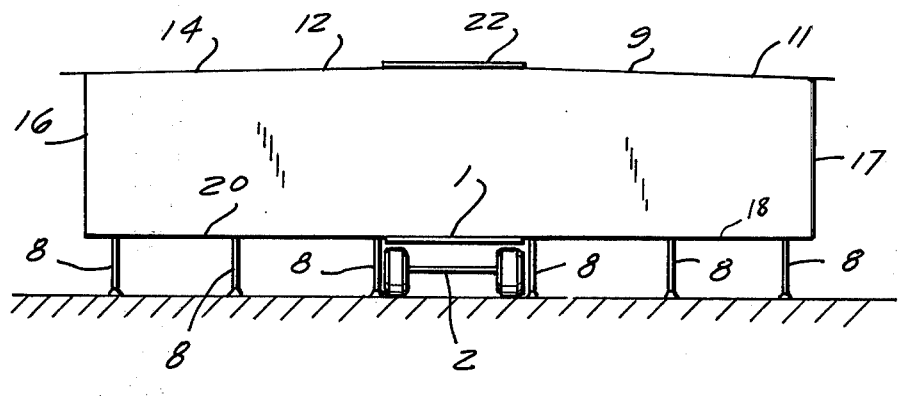
FIG. 4 is a view showing an arrangement in a working condition in accordance with another embodiment of the present invention.

FIG. 4 shows the above arrangement which is further enlarged as compared with that shown in FIG. 3.

Figure 5:
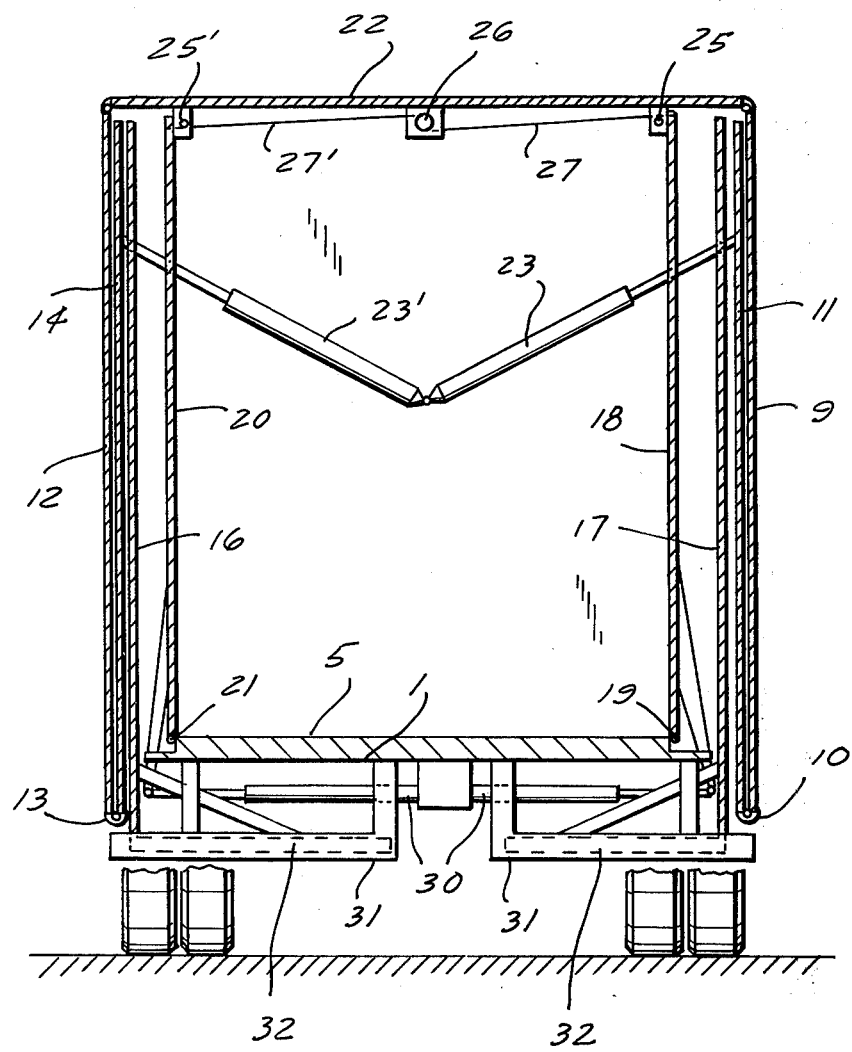
FIG. 5 is a transverse section of an arrangement in accordance with another embodiment of the invention, in a transportable condition.
Figure 6:
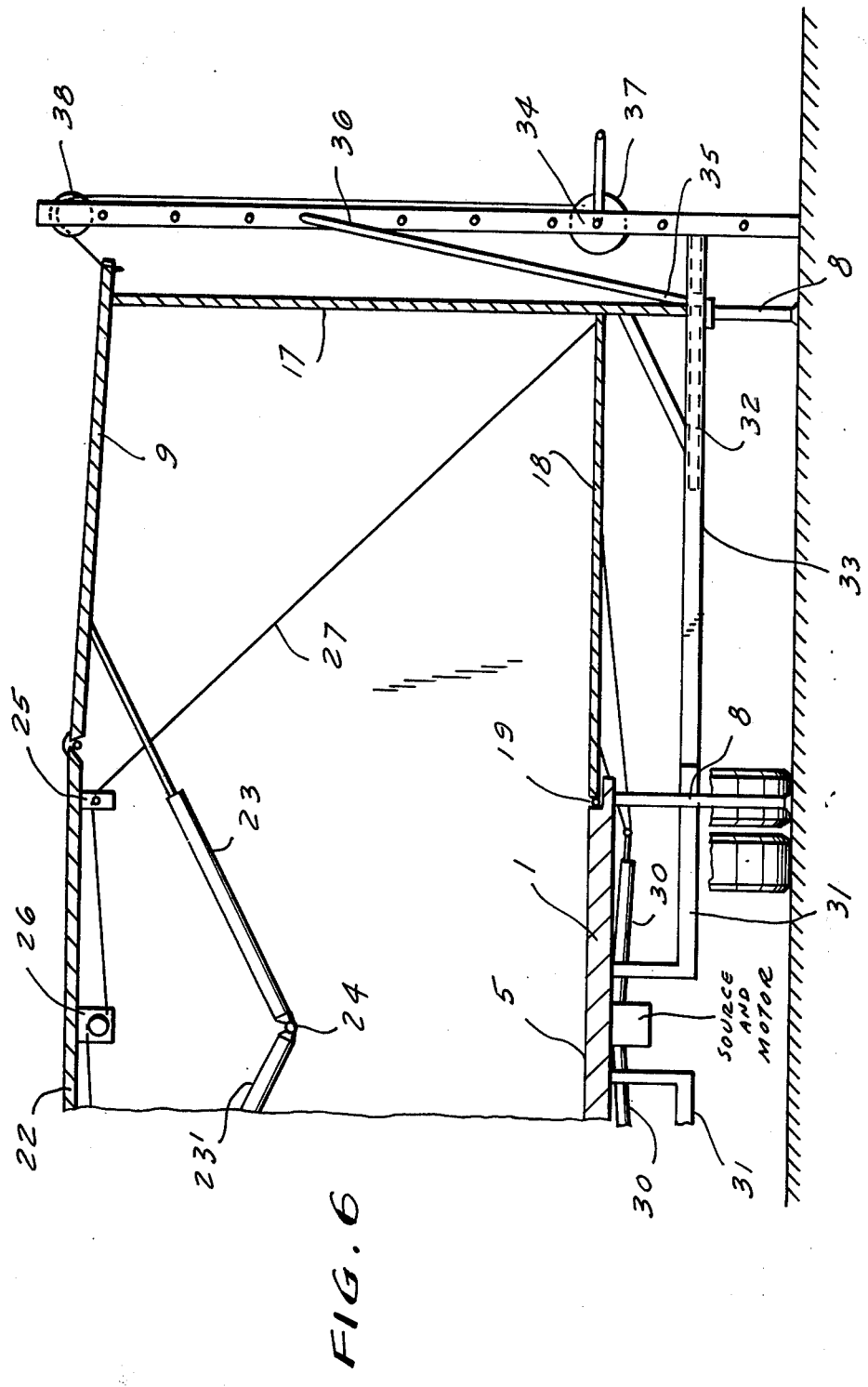
FIG. 6 is a fragmentary transverse section of the arrangement shown in FIG. 5, in a working condition.

FIGS. 5 and 6 show another embodiment of the present invention. As shown in FIG. 5 slides 32 are provided, which are movable in profile guides 31 mounted under the floor 5. The longitudinal side elements 16 and 17 are connected with the above slides 32. Guides 33 are mounted on the profile guides 31 and rest on the adjustable supports 8. Hydraulic cylinders 30 and ropes 27 and 27' can operate together with or separate from one another so as to lower the floor elements 18 and 20. The hydraulic cylinders 30 may receive their fluid from a source which is driven by an electric motor.

The walls of the arrangement which is shown in FIGS. 1 and 2, are moved into the extended position in the following manner:

When a predetermined location is reached, the trailer is parked and supported by the supports 8. Locks which are known per se and not shown in the drawing, are released and the longitudinal wall elements 9 and 12 are then moved upwardly by the action of the hydropneumatic cylinders 23 and 23'. The longitudinal side elements 16 and 17 are extended laterally by the action of the drive 28 and then supported by the supports 8. Then, the longitudinal wall element 9 and 12 are lowered so as to rest on the longitudinal side elements 16 and 17. The floor elements 18 and 20, are lowered by the action of the drive 26. An auxiliary crane 34 is mounted on the guides 33 for stabilization and is supported by a brace 36. A winch 37 is mounted on the crane 34 and carries a rope which is wound arround a roller 38 and connected to the wall element 9. The auxiliary crane is formed as a ladder and serves in case of need for climbing to the roof.

The arrangement with the extended walls in accordance with the other embodiment is shown in FIG. 6. The trailer is supported in a predetermined location by the supports 8. Then, the guides 33 are moved under the floor 5 and inserted in the profile guides 31. By lifting and lowering of the supports 8, the guides 33 are levelled. When locks which are not shown in the drawing are released, the longitudinal wall elements 9 and 12 are opened by the action of the pneumatic cylinders 23 and 23' and the crane 24. The longitudinal side elements 16 and 17 are extended by the action of the guides 33 to a stop 35. The longitudinal wall elements 9 and 12 are lowered onto the longitudinal side walls 16 and 17 and locked in this position. The floor elements 18 and 20 are lowered by the action of the hydraulic cylinders 30 located under the floor 5, and/or by the action of the ropes 27. In the case of bad weather, the front walls 3, 3' and the rear walls 4, 4' may be closed. The roof and rear walls may be extended and retracted in the same manner as the longitudinal walls of the arrangement.

It will be understood that each of the elements described above, or two or more together, may also find a useful application in other types of constructions differing from the types described above.

While the invention has been illustrated and described as embodied in an arrangement for floor gymnastics, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A moving sport arrangement for floor gymnastics, particularly for oriental martial arts, comprising a floor element; a roof element; a plurality of wall elements including first, second and third wall elements movable between an extended and a retracted position, said wall elements being located in said retracted position in accordion-like relationship with respect to each other and substantially normal to said floor and roof elements, said first wall elements being pivotable relative to said floor element and together with the latter form a floor of the arrangement in said extended position, said second wall elements being pivotable relative to said roof elements and together with the latter form a roof of the arrangement in said extended position, said third wall elements being located between said first and second wall elements in said retracted position and being translatorily movable in a direction transverse to said floor and roof elements so as to form walls of the arrangement in said extended position; and motor-operated drive means for pivoting and translatorily moving respective wall elements between said extended and retracted positions.

2. The arrangement as defined in claim 1, wherein said motor-operated drive means includes fluid-operated drive means.

3. The arrangement as defined in claim 1, wherein said first wall elements are hingedly connected to said floor element.

4. The arrangement as defined in claim 1, wherein said second wall elements are hingedly connected to said roof element.

5. The arrangement as defined in claim 1, wherein said first, second and third wall elements are formed by separate members which are free from connection with one another and are movable between said positions independently from one another.

6. The arrangement as defined in claim 2, wherein said fluid-operated drive means include hydraulically operated drive means.

7. The arrangement as defined in claim 2, wherein said fluid-operated drive means include pneumatically operated drive means.

8. The arrangement as defined in claim 1, wherein said wall elements in said extended position together bound a space which is free of supports.

9. The arrangement as defined in claim 1, wherein said third wall elements forming walls of the arrangement extend freely in said extended position.

10. The arrangement as defined in claim 1, wherein said second wall elements forming at least a portion of a roof of the arrangement are freely suspended in said extended position.

11. The arrangement as defined in claim 2, wherein said fluid-operated drive means includes means for translatorily moving said third wall elements between said positions.

12. The arrangement as defined in claim 2; and further comprising an electric motor actuating said fluid-operated means.

13. The arrangement as defined in claim 1, wherein each of said second wall elements include two wall members hingedly connected with one another and movable between positions in which they are extended from and retracted to one another.

14. The arrangement as defined in claim 9; and further comprising slides movable in guides, said third wall elements being connected to the respective one of said slides for joint movement therewith between said positions.

15. The arrangement as defined in claim 14, wherein said slides and said guides are located under said floor element.

16. The arrangement as defined in claim 14; and further comprising additional guides movably connected with said first-mentioned guides, said additional guides being detachably connected with said floor element and located under the latter.

* * * * *